(12) United States Patent
Cervantes et al.

(10) Patent No.: US 9,567,020 B2
(45) Date of Patent: Feb. 14, 2017

(54) TOWABLE ROAD MOTOR VEHICLE

(71) Applicants: Commissariat a l'energie atomique et aux energies alternatives, Paris (FR); METACAR TRANSPORT SYSTEMS, Albigny-sur-Saone (FR)

(72) Inventors: Valery Cervantes, Lyons (FR); Jerome Laborde, Lyons (FR)

(73) Assignees: COMMISSARIAT À L'ÉNERGIE ATOMIQUE ET AUX ÉNERGIES ALTERNATIVES, Paris (FR); METACAR TRANSPORT SYSTEMS, Albigny-sur-Saone (FR)

(*) Notice: Subject to any disclaimer, the term of this patent is extended or adjusted under 35 U.S.C. 154(b) by 0 days.

(21) Appl. No.: 14/773,193

(22) PCT Filed: Jan. 29, 2014

(86) PCT No.: PCT/EP2014/051672
§ 371 (c)(1),
(2) Date: Sep. 4, 2015

(87) PCT Pub. No.: WO2014/135310
PCT Pub. Date: Sep. 12, 2014

(65) Prior Publication Data
US 2016/0016619 A1 Jan. 21, 2016

(30) Foreign Application Priority Data

Mar. 8, 2013 (FR) .................................... 13 52128

(51) Int. Cl.
*B62D 53/00* (2006.01)
*B62D 47/00* (2006.01)
(Continued)

(52) U.S. Cl.
CPC ............. *B62D 53/005* (2013.01); *B60R 19/38* (2013.01); *B62D 47/006* (2013.01); *B62D 53/00* (2013.01); *B62D 61/08* (2013.01)

(58) Field of Classification Search
CPC ...... B62D 53/005; B62D 61/08; B62D 47/006; B62D 53/00; B60R 19/38
See application file for complete search history.

(56) References Cited

U.S. PATENT DOCUMENTS 5,417,300 A    5/1995 Shultz

FOREIGN PATENT DOCUMENTS

EP    1 046 574     10/2000
WO    98 40263       9/1998
WO    2007 010062    1/2007

OTHER PUBLICATIONS

International Search Report Issued Apr. 4, 2014 in PCT/EP2014/051672 Filed Jan. 29, 2014.

*Primary Examiner* — Tony Winner
*Assistant Examiner* — Gabriela C Craciun
(74) *Attorney, Agent, or Firm* — Oblon, McClelland, Maier & Neustadt, L.L.P.

(57) ABSTRACT

A towable road motor vehicle including: at least three wheels, capable of driving the motor vehicle on a level road, distributed between two front and rear wheel trains of the motor vehicle; a chassis, including an articulation device, interposed between front and rear portions of the chassis and enabling the front portion to pivot, relative to the rear portion, to modify an articulation angle of the vehicle; front and rear hitches, respectively positioned at the front and rear of the motor vehicle, and a steering device, capable of modifying the steering angle of each wheel of the front train in response to a command by a driver of the vehicle, the steering device adapted to be actuated independently of the articulation device.

16 Claims, 6 Drawing Sheets

(51) Int. Cl.
*B60R 19/38* (2006.01)
*B62D 61/08* (2006.01)

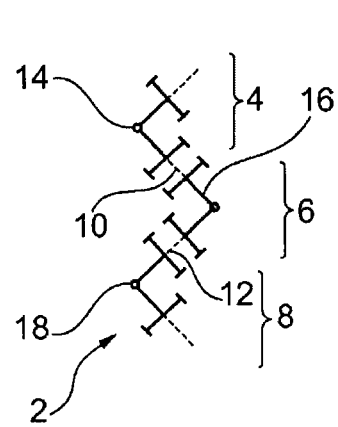
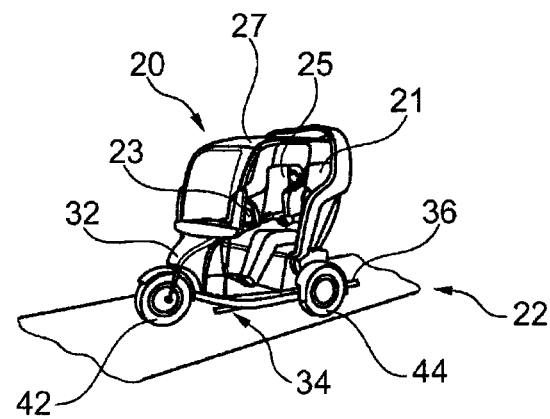
Fig. 1  Fig. 2
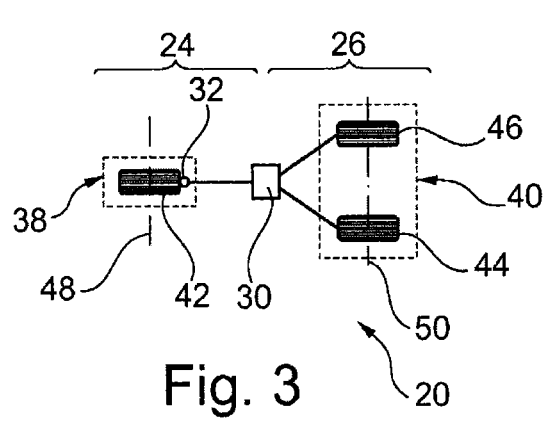
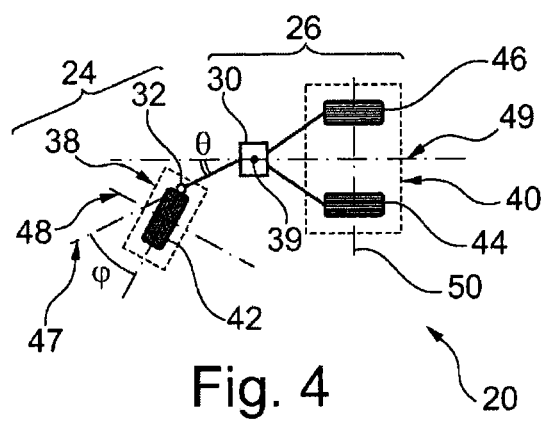
Fig. 3  Fig. 4
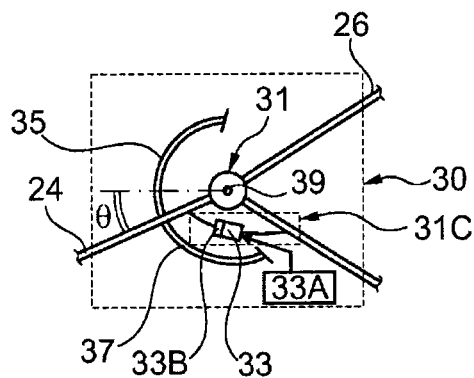
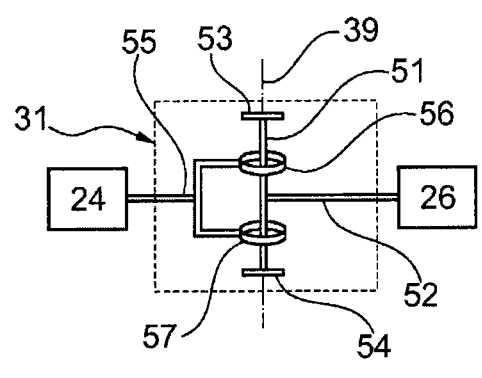
Fig. 5  Fig. 6

TOWABLE ROAD MOTOR VEHICLE

The invention concerns a towable road motor vehicle. The invention also concerns a road motor convoy formed of these vehicles and a method of controlling these vehicles.

There are known articulated road motor vehicles that are adapted to be coupled to one another by hitches with no degree of freedom in rotation in yaw to form single-track motor road convoys. Such a convoy can be driven by a single driver. The patent EP-1046574-B1 (WILLIAM M. C. RENDALL) describes an example of such vehicles for an urban mobility system.

These vehicles typically include:
at least three wheels, capable of driving the motor vehicle on a flat road, distributed between a front set of wheels and a rear set of wheels of the motor vehicle;
a chassis, including:
a front portion to which the front set of wheels is fixed;
a rear portion to which the rear set of wheels is fixed;
an articulation device disposed between the front and rear portions of the chassis, this articulation device allowing the front portion to pivot relative to the rear portion about an articulation axis normal to a rolling plane of the vehicle so as to modify an articulation angle of the vehicle, this rolling plane being defined as being the plane passing through the areas of contact between the road and the wheels of the vehicle;
a front hitch and a rear hitch situated at the front and at the rear, respectively, of the motor vehicle,
the front hitch being movable, alternately, between:
a coupled position in which this front hitch cooperates with a rear hitch identical to the rear hitch of this vehicle and situated on another vehicle to couple these vehicles mechanically to each other with no degree of freedom in rotation in yaw and to align the front portion of this vehicle with the rear portion of the other vehicle, and
an uncoupled position in which these vehicles are uncoupled from each other;
the rear hitch being movable, alternately, between:
a coupled position, in which this rear hitch cooperates with a front hitch identical to the front hitch of this vehicle and situated on another vehicle to couple these vehicles mechanically to each other with no degree of freedom in rotation in yaw and to align the rear portion of this vehicle with the front portion of the other vehicle, and
an uncoupled position in which these vehicles are uncoupled from each other.

The following prior art documents are also known:
WO2007/10062 A2 (RENDALL WILLIAM MICHAEL);
U.S. Pat. No. 5,417,300 A (SCHULTZ RICHARD E);
WO 98/40263 (TOIT CHARL WILHELMUS DU).

A more compact convoy can therefore be formed. These vehicles have drawbacks, however. In particular, a road motor convoy formed of these vehicles has limited maneuverability if the vehicle situated at the head of the convoy must turn in place, for example to leave a parking space and enter a stream of traffic. In fact, turning in place of the front set of wheels of the vehicle situated at the head of the convoy causes the rear set of wheels of this vehicle to turn in the opposite direction. This turning in the opposite direction is propagated to the other vehicles of the motor road convoy, leading to "jacknifing" of the convoy. FIG. 1 represents diagrammatically one such jacknifed convoy 2. Here this convoy 2 is formed of three identical motor vehicles 4, 6, 8 coupled to one another by hitches 10, 12 with no degree of freedom in rotation in yaw. The respective steering devices 14, 16, 18 (provided here by chassis articulation devices) of each of these vehicles 4, 6, 8 are turned in opposite directions two by two. Because of this jacknifing of the convoy, a very high force must be exerted on the steering device of the head vehicle to turn in place to change traffic lane. In fact, the force to be exerted corresponds to that necessary to turn the wheels of the head vehicle plus the force necessary to jacknife the convoy. This makes moving it difficult.

Thus there exists a need for a towable articulated road motor vehicle the hitch of which has no degree of freedom in rotation in yaw, this vehicle having enhanced maneuverability in a situation of turning in place when it is coupled to other motor vehicles to form a road motor convoy.

In the present description, by "articulated vehicle" is meant a motor vehicle including the articulation device.

Here rotation in yaw means a movement of rotation only about an axis perpendicular to the rolling plane of the vehicle. The rolling plane of a vehicle is defined as the plane passing through the areas of contact between the wheels of the vehicle and the road on which the vehicle is traveling.

The hitch is said to have no degree of freedom if, when front and rear hitches are coupled to each other, the maximum angle of rotation in yaw of these hitches relative to each other because of mechanical play is less than 10° or 5° or 3° or 2°.

The invention therefore concerns a towable road vehicle as claimed in claim 1.

By equipping the front set of wheels of the vehicle with a steering device that can be actuated independently of the articulation device, the vehicle can therefore be maneuvered in place without causing the rear set of wheels to turn in the opposite direction. The force required to turn the head vehicle of the convoy in place is then considerably reduced, since the use of the steering device of this vehicle does not lead to jacknifing of the convoy.

The embodiments of the invention may have one or more of the features of claims 2 to 11.

Moreover, these embodiments have the following advantages:
the equidistant position of the instantaneous rotation axis of the articulation of the front and rear chassis portions relative to the transverse axes of the sets of wheels of the vehicle enable each towed vehicle of a road convoy including a plurality of these vehicles coupled to one another to follow a curved single path or single track, the expression towed vehicles meaning the vehicles of the convoy situated behind the vehicle at the head of the convoy; this convoy is then referred to as a "single-track" convoy;
the front and rear sets of wheels that can be nested with each other make it possible to reduce the space separating two motor vehicles coupled to each other and therefore to reduce the overall size of a road convoy formed of vehicles coupled to one another;
nesting the front and rear sets of wheels so that their transverse axes coincide eliminates skidding of the wheels of these sets of wheels on a curved path;
the low value of the castor offset of the front set of wheels limits the mechanical force to be applied to turn this front set of wheels using the steering device;
the configuration of the mechanical stops for obtaining a smallest turning or steering radius of the steering device of the head vehicle greater than the smallest steering radius generated by the articulation devices of the other vehicles enables the formation of a convoy formed of vehicles coupled to one another and having different wheelbases, at the same time as reducing the risk of immobilization of this road convoy because of the articulation device of one of these vehicles becoming immobilized against a stop;

attaching the passenger compartment to the front portion of the vehicle and fixing the driver's seat in the passenger compartment prevents the steering wheel of this vehicle from moving relative to the driver when the convoy turns. This therefore prevents a driver or an occupant of the passenger compartment being injured by movement of the steering wheel.

In accordance with another aspect, the invention also concerns a motor road convoy as claimed in claim 12.

In accordance with another aspect, the invention also concerns a method as claimed in claim 13 of controlling a towable road motor vehicle.

The embodiments of the invention may have the feature of claim 14.

In accordance with another aspect, the invention also concerns a method as claimed in claim 15 of controlling a road motor convoy.

The embodiments of the invention may have the feature of claim 16.

The invention will be better understood on reading the following description given by way of nonlimiting example only and with reference to the drawings, in which:

FIG. 1 is a diagrammatic illustration, in plan view, of a motor road convoy that has jacknifed following a maneuver of turning in place;

FIG. 2 represents diagrammatically, in perspective view, a towable road motor vehicle;

FIGS. 3 and 4 represent diagrammatically, in plan view, a geometry of the front and rear sets of wheels of the vehicle from FIG. 2;

FIG. 5 represents diagrammatically one example of an articulation device between the front and rear chassis portions of the vehicle from FIG. 2;

FIG. 6 represents diagrammatically, in elevation view, a mechanical articulation of the articulation device from FIG. 5;

In these figures, the same references are used to designate the same elements.

Figure 7:
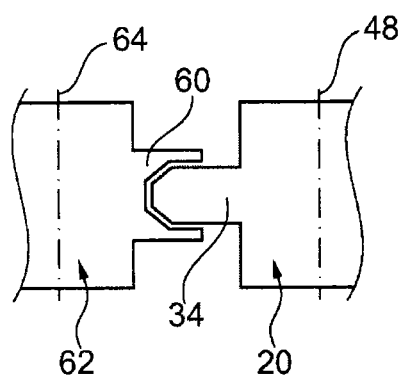
FIGS. 7 and 8 represent diagrammatically front and rear hitches of the vehicle from FIG. 2.

In the remainder of this description, features and functions well known to a person skilled in the art are not described in detail.

Figure 8:
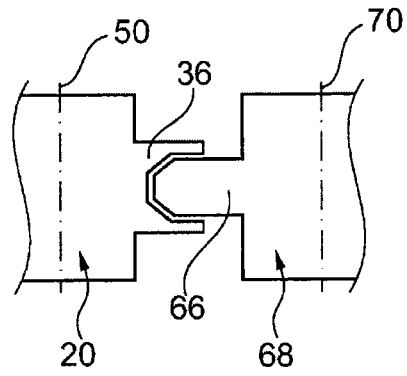

FIGS. 2 to 4 represent a towable road motor vehicle 20. This vehicle 20 is able to move on a road 22 (FIG. 2), for example a flat road. Here this road 22 is flat and horizontal. In this example, this vehicle 20 includes:

three wheels;

a chassis including a front portion 24 and a rear portion 26 (FIGS. 3 and 4);

an articulation device 30 and a steering device 32 (FIGS. 3 and 4);

a front hitch 34 and a rear hitch 36 (FIGS. 7 and 8);

a motor, such as an electric motor, able to propel the vehicle 20.

The vehicle 20 is controlled by a driver. To this end, the vehicle 20 includes a driver's seat 21 and a driving station. This driving station includes controls of the motor and a steering wheel 23 for steering the vehicle 20. Here this vehicle 20 also includes a passenger seat 25. Here the driving station and the driver's seat 21 are fixed to the interior of a passenger compartment 27 of the vehicle 20. The passenger compartment 27 is attached to the portion 24 with no degree of freedom in yaw and here rests entirely on this portion 24. The passenger compartment 27 and the front portion 24 of the chassis therefore move at the same time. The passenger compartment 27 is not mechanically connected directly to the portion 26. The passenger compartment 27 therefore moves in yaw relative to the rear portion 26 of the chassis when the rear portion 26 moves relative to the front portion 24.

Here the driver's seat 21 is fixed to the interior of the passenger compartment 27 but allows limited movement for adjusting the position of the seat 21, for example as a function of the height and girth of an occupant of this seat 21. The seat 21 may offer limited movement in translation relative to the passenger compartment 27 with one degree of freedom, for example. Here the expression limited movement means that the seat 21 is able to move relative to the passenger compartment 27 with a travel less than or equal to 50 cm or 25 cm.

Here the vehicle 20 further includes a body which rests on both portions 24 and 26.

The vehicle 20 can travel on the road 22 on the wheels. These wheels are placed on the vehicle so as to form a front set of wheels 38 and a rear set of wheels 40. Here these sets of wheels 38 and 40 are fixed to the portions 24 and 26, respectively, of the chassis. These wheels are equipped with pneumatic tires, for example.

A "transverse axis" is defined for each of these sets of wheels in the following manner:

if the set of wheels includes only one wheel, the transverse axis is the axis parallel to the rolling axis of this wheel about its hub and passing through the geometrical center of the area of contact between the road 22 and this wheel when this wheel is not steered, and if the set of wheels includes more than one wheel, the transverse axis is the axis passing through the geometrical centers of the areas of contact between the road 22 and these wheels when these wheels are not steered.

Each of these transverse axes is fixed with no degree of freedom relative to the chassis portion to which the respective set of wheels associated with this transverse axis is fixed.

The rolling axis of a wheel is defined as being the horizontal rotation axis about which the wheel rotates when it rolls on the road 22.

Here the device 32 is adapted to steer one or more wheels of the vehicle. The wheels that can be steered are referred to as "steerable" wheels. The non-steerable wheels cannot be steered and are therefore permanently in a non-steered position.

The wheels of a vehicle are referred to as non-steered when they are aligned with one another in a position such that a motor vehicle identical to the vehicle 20 but in which the device 30 is replaced by a rigid connection preventing any movement of the portions 24 and 26 relative to each other is able to move in a straight line.

All the wheels of the same set of wheels are generally aligned along the transverse axis of this set of wheels when these wheels are not steered.

In this example, the set of wheels 38 includes a single wheel 42. The set of wheels 40 includes two wheels 44 and 46, here identical and parallel to each other. The rolling axis of the wheels 44, 46 is fixed with no degree of freedom in rotation in yaw relative to the rear portion 26 of the chassis. According to the above definition, transverse axes 48 and 50 are therefore defined for the sets of wheels 38 and 40, respectively.

A longitudinal plane of the vehicle 20 is also defined as being the plane:
    perpendicular to these axes 48 and 50 when these axes 48 and 50 are parallel to each other and the wheels of the vehicle 20 are not steered, and
    passing through the middle points of the sets of wheels 38 and 40.

The remainder of this description refers to the orthogonal projection of this plane onto the rolling plane. The expression longitudinal axis is then used to designate the axis resulting from this projection. Here the middle point of the set of wheels 38 is the center of the wheel 42 and the middle point of the set of wheels 40 is the point equidistant from the centers of contact between the road 22 and the wheels 44 and 46.

A longitudinal axis 47 of the portion 24 of the vehicle 20 is defined as being the axis fixed relative to the portion 24 that coincides with the longitudinal axis of the vehicle when the axes 48 and 50 are parallel and the wheels of the vehicle 20 are not steered.

Similarly, a longitudinal axis 49 of the portion 26 is defined as being the axis fixed relative to the portion 26 coinciding with the longitudinal axis of the vehicle 20 when the axes 48 and 50 are parallel and the wheels of the vehicle 20 are not steered.

The rolling plane is the plane passing through the areas of contact between the road 22 and the wheels 42, 44 and 46. Here this rolling plane is horizontal.

The device 30 allows the portions 24 and 26 to pivot relative to each other about an articulation axis 39 normal to a rolling plane of the vehicle in order to modify an articulation angle θ of the vehicle 20 (FIG. 4). This angle θ is defined here as the acute angle between the longitudinal axes 47 and 49 of the portions 24 and 26, respectively. Here this axis 39 coincides with the instantaneous rotation axes of the portions 24 and 26 relative to each other. Here the axes 47 and 49 intersect the axis 39.

FIG. 5 represents an example of this device 30 in more detail. In this example, this device 30 includes:
    a mechanical articulation 31,
    a controllable mechanism 31C for locking the articulation 31 to maintain the angle θ at its zero value;
    an automatic control unit 33A adapted to control the mechanism 31C,
    stops 35 and 37 arranged on the chassis to limit the smallest steering radius allowed by the device 30.

The mechanism 31C is adapted to move alternately between:
    a locked position in which it holds the portions 24 and 26 of the vehicle 20 aligned with each other, and
    an unlocked position in which the portions 24 and 26 are free to pivot relative to each other in rotation about the articulation axis 39.

Here the portions 24 and 26 are referred to as aligned with each other if their longitudinal axes 47 and 49 coincide.

Here this mechanism 31C includes:
    an actuator 33 for modifying the angle θ in response to a command supplied by the unit 33A, and
    a sensor 33B for measuring the angle θ.

The device 30 is advantageously able, thanks entirely to its mechanical conformation, to maintain the instantaneous rotation axis of the portion 24 relative to the portion 26:
    equidistant from the transverse axes 48, 50 of the sets of wheels of the vehicle when these transverse axes are parallel, and
    on the bisector of the acute angle formed by these transverse axes 48, 50 when these transverse axes are not parallel and the wheels of the vehicle 20 are not steered.

Here the articulation 31 is equidistant from the axes 48 and 50 when these axes are parallel. The instantaneous center of rotation of the portion 24 relative to the portion 26 is therefore situated on the axis 39 and here is equidistant from the axes 48 and 50.

The articulation 31 preferably includes a pitch limiter configured to limit pitching of the portions 24 and 26 relative to each other. Here pitching of a chassis portion means a movement of front to rear swinging of this chassis portion when the vehicle 20 is moving in a straight line on the road 22. The articulation 31 advantageously further includes a roll limiter to limit rolling movement between the portions 24 and 26. Here rolling of a chassis portion means a movement of lateral pivoting about the longitudinal axis of this chassis portion when the vehicle 20 is moving in a straight line on the road 22.

Here the articulation 31 fastens the two portions 24 and 26 together in a non-detachable manner.

Here the actuator 33 is mechanically connected directly between the portions 24 and 26. In addition to locking the articulation 31, the actuator 33 here makes it possible alternately to push away from each other and pull toward each other these portions 24, 26 by causing them to pivot about the axis 39. The actuator 33 is adapted to move the portions 24 and 26 in response to a command to produce a predetermined value of the angle θ and then to maintain the angle θ at this value until a new command is received. For example, the actuator 33 includes one or more cylinders such as hydraulic cylinders.

Here the stops 35, 37 are fixed with no degree of freedom onto the portion 24. They are disposed to abut against respective counter-stops mounted with no degree of freedom on the portion 26 in order to limit the angular movement of the articulation 31. They therefore maintain the value of the angle θ in a range [θ$_{min}$; θ$_{max}$]. The position in which the portions 24 and 26 are aligned with each other corresponds to the zero value of the angle θ. For example, the angular range [θ$_{min}$; θ$_{max}$] is symmetrical about the zero value and between −90° and +90° or between −55° and 55°.

The vehicle is therefore able to move in a straight line when the portions 24 and 26 are aligned and the wheels are not steered.

FIG. 6 represents an example of the articulation 31 of the device 30. This articulation 31 includes:

a vertical shaft 51 connected mechanically with no degree of freedom to the portion 26 by a bar 52, and rings 56, 57 mechanically connected with no degree of freedom to the portion 24 of the chassis by a bar 55.

The shaft 51 is rotatably received inside the rings 56, 57. Shoulders 53, 54 at the ends of the shaft 51 retain it inside the rings 56, 57. Here the rings 56, 57 are respectively disposed between the bar 52 and the shoulder 53 and between the bar 52 and the shoulder 54. The portions 24 and 26 can therefore pivot about the axis 39. Here the reduced clearance between the shaft 51 and the interior of the rings 56, 57 limits pitching and rolling movements of the portions 24, 26 relative to each other.

FIGS. 7 and 8 represent in more detail the hitches 34 and 36, respectively. The hitches 34 and 36 are situated at the front and at the rear of the vehicle 20, respectively. Here these hitches 34 and 36 are anchored to the portions 24 and 26, respectively, of the chassis with no degree of freedom in rotation in yaw.

The hitch 34 is movable alternately between coupled and uncoupled positions. In its coupled position (FIG. 7), the hitch 34 cooperates with a rear hitch 60 situated on another vehicle 62 to couple it mechanically to the vehicle 20. Here the vehicle 62 is identical to the vehicle 20. In FIG. 7, the transverse axis of the rear set of wheels of the vehicle 62 bears the reference 64. Moreover, to make FIGS. 7 and 8 more legible, the transverse axes of the sets of wheels of the coupled vehicles are represented at a distance, one beside the other.

In the coupled position the front portion 24 of the vehicle 20 is mechanically connected with no degree of freedom in rotation in yaw to the rear portion of the chassis of the vehicle 62. To this end, the hitches 34 and 60 are each equipped with rigid parts of complementary shape adapted to nest one in the other, for example. The hitch 34 includes a rigid part of convex shape and the hitch 60 includes a rigid part of concave shape, for example. These concave and convex shapes are preferably not rounded so as to prevent rotation about a vertical axis of the hitch 34 relative to the hitch 60 when these hitches 34 and 60 are coupled. For example, the rigid parts are made of metal and fixed to the corresponding portion of the chassis of the vehicles 20 and 62 with no degree of freedom in rotation in yaw. The respective longitudinal axes of the portion 24 and the rear portion of the vehicle 62 are therefore aligned parallel to each other. Moreover, the axes 48 and 64 are held at a distance from each other that is constant to within 1% or 3%, for example, by means of a retaining device. Here this retaining device includes two magnets of opposite polarity disposed facing each other on the portions 24 and 26, for example.

In order to limit the space between the vehicles 20 and 62 in the coupled position, the front of the vehicle 20 and the rear of the vehicle 62 have complementary shapes to allow the axes 48 and 64 to coincide in the coupled position. To this end, the front set of wheels 38 of the vehicle 20 and the rear set of wheels of the vehicle 62 have complementary shapes.

Under these conditions, in the coupled position, the wheel 42 of the vehicle 20 is aligned on the same transverse axis as the wheels of the rear set of wheels of the vehicle 62. These sets of wheels are then referred to as completely nested. This reduces the skidding to which the wheels of the nested sets of wheels are subjected when the vehicles coupled to one another follow a curved path, for example in a turn. This reduces the wear of the pneumatic tires of these wheels and improves the roadholding of these vehicles.

In the uncoupled position, these two vehicles 20 and 62 are uncoupled from each other and are free to move independently of each other.

In an analogous manner, the hitch 36 is movable alternately between coupled and uncoupled positions. In its coupled position (FIG. 8) the hitch 36 cooperates with a front hitch 66 situated on a vehicle 68 to couple these vehicles mechanically to each other. To this end, the hitches 36 and 66 are identical to the hitches 60 and 34, respectively. The vehicle 68 is identical to the vehicle 20, for example. In FIG. 8, the transverse axis of the front set of wheels of the vehicle 68 bears the reference 70.

Figure 9:
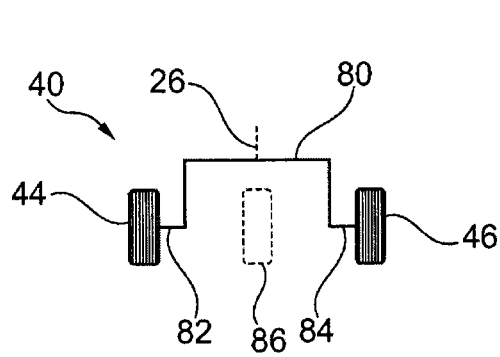
FIG. 9 represents diagrammatically, in front view, the rear set of wheels of the vehicle from FIG. 2.

FIG. 9 represents the set of wheels 40 in more detail. This set of wheels 40 includes:

the wheels 44, 46, and a crossmember 80 mechanically connected with no degree of freedom in rotation in yaw to the portion 26.

The crossmember 80 extends parallel to the axis 50 of the set of wheels 40. This crossmember 80 mechanically connects to each other the hubs 82, 84 of the wheels 44 and 46, respectively. The crossmember 80 is raised relative to the rolling axis of the wheels 44 and 46 so as to leave a space 86 for the front wheel of the vehicle 68 when these vehicles are coupled to each other by means of the hitch 36. This crossmember 80 is raised by a distance greater than the radius of the wheel 42, for example.

These complementary shapes make it possible to reduce the space separating two vehicles coupled to each other and therefore to reduce the overall size of a road convoy formed of these coupled vehicles.

Figure 10:
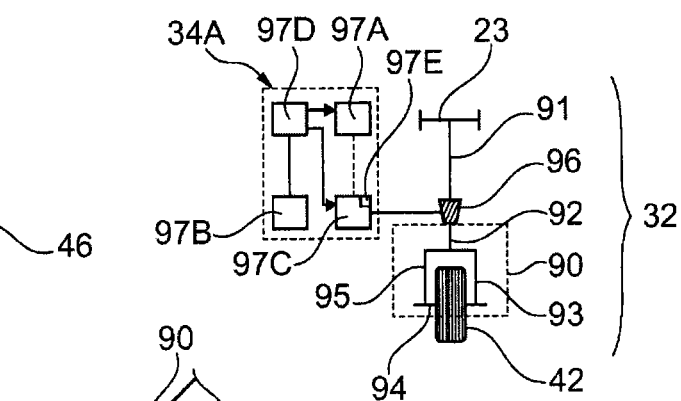
FIG. 10 represents diagrammatically, in front view, the front set of wheels and the steering device of the vehicle from FIG. 2.

FIG. 10 represents an example of the device 32 for modifying the direction of the path of the vehicle 20. The device 32 is adapted to modify the steering angle φ (FIG. 4) of the wheel 42 in response to a command from a driver of the vehicle 20. Here the steering angle of a front wheel of the vehicle 20 is defined as being the acute angle between the vertical plane perpendicular to the rolling axis of the wheel and the vertical plane containing the longitudinal axis 47 of the portion 24. To simplify FIG. 4, the device 32 is represented offset toward the rear of the wheel 42. When the wheel 42 is not steered, this angle φ is zero.

This device 32 is notably adapted to be actuated by a driver:

independently of the device 30, and only when the hitch 34 of the vehicle 20 is in its uncoupled position.

Figure 15:
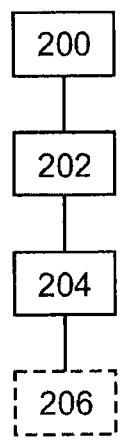
FIG. 15 is a flowchart of a method of controlling the steering device of the vehicle from FIG. 2.

The control of this device 32 is described in more detail with reference to FIG. 15.

Here the device 32 includes:

a fork 90 attached to the wheel 42, a steering column 91, and the steering wheel 23 attached with no degree of freedom in rotation to the column 91.

This fork 90 includes a steering bar 92 which is divided at its lower end into two branches 93 and 95. The branches 93 and 95 are fixed to the bar 92. Here the column 91 is also fixed to the bar 92. The lower ends of the branches 93, 95 are mechanically connected to a hub 94 of the wheel 42 so as to allow the wheel 42 to rotate about its rolling axis. Here the device 32 includes a bearing 96 mechanically connected with no degree of freedom to the portion 24 of the chassis of the vehicle 20. To allow the wheel 42 to rotate the bar 92 pivots inside this bearing, here about a rotation axis of the bearing 96.

FIG. 10 also represents one embodiment of a device 34A for maintaining the steering angle of the wheel 42 at its zero value when the hitch 34 is in its coupled position. In fact, when the vehicle 20 is coupled to the vehicle 62 the rolling axis of the wheel 42 is held parallel to the rolling axis of the wheels of the rear set of wheels of the vehicle 62. When the front set of wheels of the vehicle 20 includes a single wheel 42, this amounts to maintaining the transverse axes 48 and 64 parallel to each other when these vehicles 20 and 62 are coupled. For example, the hitches 34 and 60 hold the respective longitudinal axes of the portion 24 and the rear portion of the vehicle 62 aligned with each other. The wheel 42 is brought into alignment with the axis 47 until the steering angle $\phi$ is zero. The axes 48 and 64 are then aligned parallel to each other.

In this embodiment, the device 34A is adapted to steer the wheel 42 automatically so that the turning angle becomes zero (and the transverse axis 48 therefore becomes parallel to the transverse axis 64), and then to lock the wheel 42 in this position when the hitch 34 is in its coupled position. To this end, in this embodiment the device 34A includes:

a controllable locking device 97A, a sensor 97B sensing the position of the hitch 34, a controllable electric actuator 97C adapted to turn the wheel 42 to its position in which its steering angle is zero, and a unit 97D for controlling the actuator 97C and the lock 97A as a function of information delivered by the sensor 97B.

Here the actuator 97C also includes a sensor 97E for measuring the steering angle $\phi$ adapted to communicate with the unit 97D to supply the value of this angle $\phi$.

Here the device 97A is an electrical lock. This device 97A will therefore be referred to hereinafter as the "lock". The lock 97A is configured to prevent actuation of the device 32 by the driver when the hitch 34 of the vehicle 20 is in its coupled position. To this end, this lock 97A is movable between:

a locked position in which it prevents rotation of the steering column 91, and an unlocked position in which the driver can move the column 91 to steer the wheel 42.

The sensor 97B senses the coupled and uncoupled positions of the hitch 34 and delivers this information to the control units 33A and 97D. The functioning of the device 34A is described in more detail with reference to FIG. 15.

The device 32 advantageously has a castor offset D the absolute value of which is less than the shortest distance separating the axis 39 from the axis 48 when the axes 48 and 50 are parallel. Here the absolute value of this castor offset is three times or ten times less than this shortest distance and preferably twenty times less than this distance.

By castor offset is meant the algebraic distance between:

the geometrical center of the area of contact between the road 22 and the wheel 42, and the projection in the rolling plane of the rotation axis of the device 96.

Figure 11:
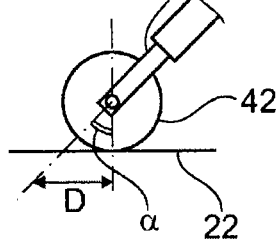
FIG. 11 represents diagrammatically, in elevation view, the castor offset of the steering device and the front set of wheels from FIG. 10.

Here the castor offset D is obtained by choosing a castor angle α the absolute value of which is less than 15° or 10° and greater than 0°. FIG. 11 represents this castor angle α in more detail. Here this castor angle α is positive. Because of the small value of the castor offset D, less mechanical force is required to steer the wheel 42 of the set of wheels 38. This therefore improves the maneuverability of the vehicle 20.

By actuating the device 32 independently of the device 30, the maneuverability of the vehicle 20 is increased when this vehicle is coupled to another vehicle to form a road convoy. In particular, the risk of such a road convoy jack-nifing when turning in place is reduced.

When the vehicle 20 is at the head of a road convoy including other vehicles coupled to one another, i.e. when it is in front of one of these other vehicles and is not itself coupled to the rear of another vehicle, then the minimum steering radius of the device 32 (the articulation device 30 of this vehicle being locked) is advantageously greater than the minimum steering radius allowed by the respective articulation devices of the towed vehicles (when their respective steering devices 32 are not turned). This limitation is provided by the stops 35 and 37 and stops disposed on the device 32, for example. Limiting the steering radius of the device 30 of the towed vehicles to a value less than the steering radius of the device 32 reduces the risk of the device 30 of the towed vehicles locking up even if these towed vehicles are different lengths.

Figure 12:
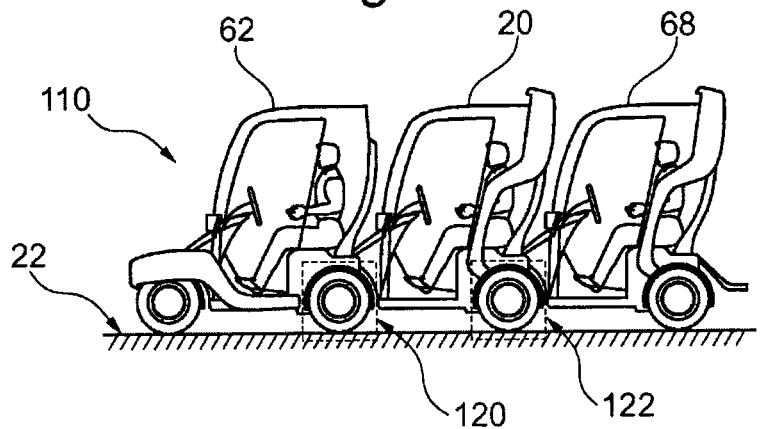
FIGS. 12 and 13 represent diagrammatically, respectively in elevation view and in plan view, a motor road convoy including the vehicle from FIG. 2.
Figure 13:
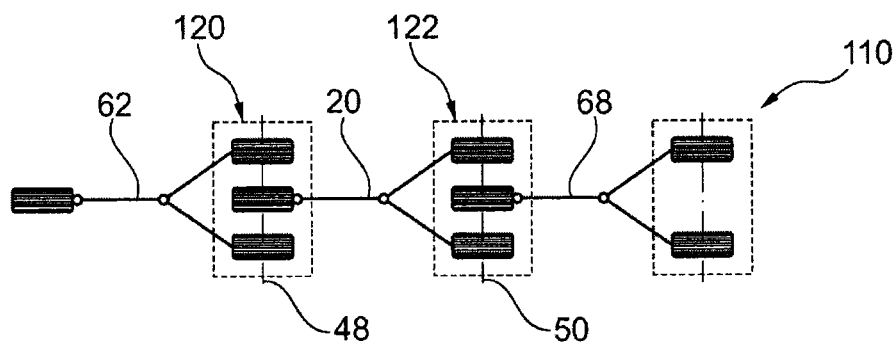

FIGS. 12 and 13 represent a road convoy 110 on the road 22. In this example, this convoy 110 is formed of vehicles 20, 62 and 68 coupled to one another in pairs by means of hitches 34, 36, 60 and 66. For simplicity, the details of the vehicles of the convoy 110 are not shown in FIGS. 12 and 13. Here these vehicles 20, 62 and 68 are aligned in a rectilinear manner so that the respective longitudinal axes of these vehicles coincide. The transverse axes of the front and rear sets of wheels of each of the vehicles are parallel two by two. Here the rear set of wheels of the vehicle 62 is completely nested with the set of wheels 38 of the vehicle 20 (FIG. 13). Likewise, the front set of wheels of the vehicle 68 is completely nested with the set of wheels 40 of the vehicle 20. These nested sets of wheels therefore behave as single sets of wheels 120, 122 (FIG. 13). The vehicle 62 is at the head of the convoy 110 with its front hitch in the uncoupled position. Hereinafter the vehicle 60 is referred to as the "head vehicle" of the convoy. The vehicles 20 and 68 are referred to as "towed vehicles". The device 32 of this vehicle 62 can be controlled by the driver of the vehicle 62 to steer the convoy 110. Here the device 30 of the vehicle 62 is locked by the actuator 33 and the angle θ is maintained at a zero value so that the portions 24 and 26 of the chassis are aligned longitudinally. The device 32 of the towed vehicles 20 and 68 cannot be actuated by the respective drivers of these vehicles 20 and 68.

Figure 14:
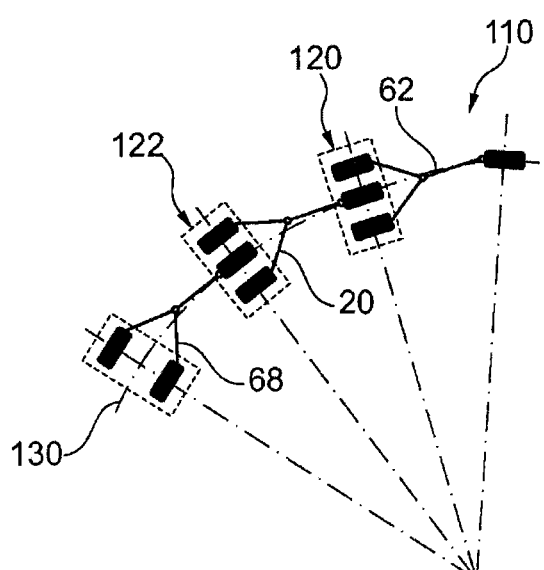
FIG. 14 represents diagrammatically the arrangement of the sets of wheels of the road convoy from FIGS. 12 and 13 along a curved path.

FIG. 14 represents the convoy 110 on a curved path, for example when the convoy 110 is performing a turn.

The geometrical centers of the respective sets of wheels of each towed vehicle of the convoy 110 (thus here the sets of wheels 120 and 122 and also the rear set of wheels of the vehicle 68) follow the same path 130. Here the path 130 is a circular arc with center 132. The center 132 is the point at which these respective transverse axes of the sets of wheels of the towed vehicles of the convoy 110 converge. The towed vehicles 20 and 68 follow a single track relative to the set of wheels 120 of the head vehicle 62, i.e. the centers of the respective sets of wheels of each towed vehicle are all at the same distance from the center 132. Here following a single track in this way is obtained by the mechanical conformation of the device 30 which makes it possible to maintain the position of the instantaneous rotation axis of the portion 24 relative to the portion 26:

equidistant from the transverse axes 48, 50 of the sets of wheels of the vehicle when these transverse axes are parallel, and on the bisector of the acute angle formed by these transverse axes 48, 50 when these transverse axes are not parallel and the wheels of the vehicle 20 are not steered.

In an analogous manner to what has been described with reference to the vehicles 62 and 20, the hitches 36 and 66 keep the respective longitudinal axes of the portion 26 and the front portion of the vehicle 68 aligned with each other. The wheel of the front set of wheels of the vehicle 68 is kept aligned with the set of wheels 40 because its steering device is immobilized when this wheel is not steered.

An example of a method of controlling the vehicle 62 is described next with reference to the FIG. 15 flowchart.

Initially, it is assumed that the vehicle 68 is uncoupled from the vehicle 20. During a step 200, the driver of the vehicle 20 detaches their vehicle from the vehicle 62. For example, to this end, when the vehicle 62 is stationary, the driver selects reverse. In response to this, the hitch 34 is moved automatically toward its uncoupled position. The sensor 97B of the device 34A immediately detects this movement into the uncoupled position and transmits this information to the control units 33A and 97D. In response to this, the unit 33A controls the actuator 33 so as to bring the angle θ to the zero value and then locks the articulation 31 to prevent the portions 24 and 26 from pivoting relative to each other about the axis 39 when the hitch 34 is in its uncoupled position. Only after this does the unit 97D cause the lock 97A to go from its locked position to its unlocked position. The vehicle 20 can then be driven by the driver using the steering wheel 23. On completion of the step 200 each of the vehicles 20, 62 and 68 is driven and steered independently by the respective driver by means of their respective device 32.

During a step 202, the vehicle 20 is coupled to the rear of the vehicle 62. To this end, while the vehicle 62 is stationary, the vehicle 20 is moved toward the rear of the vehicle 62 to nest the hitches 34 and 60 with each other. This automatically causes the hitches 34 and 60 to go into their coupled position. The sensor 97B of the device 34A of the vehicle 20 then senses the coupled position and immediately transmits this information to the control units 33A and 97D. In response to this, the unit 33A controls the actuator 33 so as to allow the articulation 31 to rotate. The portions 24 and 26 of the vehicle 20 can then pivot freely relative to each other about the axis 39. At the same time, the front hitch of the vehicle 62 remains in its uncoupled position. After this the unit 97D controls the actuator 97C so as to turn the wheel 42 of the front set of wheels 38 automatically into a position in which its steering angle is zero. After this, the unit 97D controls the movement of the lock 97A toward its locked position so as to immobilize the steering column 91 against rotation when the hitch 34 is in its coupled position. The device 32 of this vehicle 20 can therefore no longer be actuated by a driver of the vehicle. In particular, the articulation of the vehicle 62 is immobilized in a position in which its articulation angle is zero while its steering device is free to allow this vehicle 62 to be driven. The driver of the vehicle 62 steers the convoy formed in this way using the steering wheel 23 of this vehicle.

During a step 204, the vehicle 68 is coupled to the rear of the vehicle 20 to form the convoy 110. The step 204 is identical to the step 202 except that it involves the vehicles 20 and 68. Moreover, in contrast to the vehicle 62 at the head of the convoy 110, the articulation 31 remains free while the device 32 is held in a state such that it cannot be controlled by the driver of the vehicle 20.

The vehicles of the convoy 110 can then be uncoupled from one another as described for the step 200.

Numerous other embodiments are possible. For example, the wheels of the vehicle may be distributed differently. Thus in one variant the front set of wheels includes at least two wheels and the rear set of wheels includes only one wheel. In another variant, the vehicle 20 includes more than three wheels. In this other variant, each set of wheels includes at least two wheels. The vehicle 20 may also include jockey wheels (also known as castor wheels or swivel wheels) fixed to the chassis but not forming part of the front and rear sets of wheels. In particular these jockey wheels cannot be controlled by the devices 30 and 32. The direction of these wheels automatically aligns with the path of the vehicle because they have a positive castor offset.

The vehicle 20 may be a different shape to that described. For example, the vehicle 20 is a quadricycle including a single front seat. The passenger seat 25 may be omitted or placed behind the seat 21.

The driver's seat 21 may also be fixed to the passenger compartment 27 with no degree of freedom. Likewise the passenger seat 25. These seats may also be adjustable with two degrees of freedom.

The vehicles forming the convoy 110 may be different from one another. For example, the vehicles may be different lengths. The front and/or rear sets of wheels of two of these vehicles may have different separations. These vehicles may have different numbers of wheels. For example, some vehicles include three wheels, others four. However, the respective front and rear hitches of these vehicles are identical (or at least compatible) to facilitate coupling these vehicles in pairs. It is also possible to couple a trailer to a vehicle. For example, this trailer is identical to the vehicle except that it does not include a steering device 32 and the transverse axis of the front set of wheels is permanently locked in a position in which it is parallel to the transverse axis of the rear set of wheels of the vehicle to which it is coupled. The trailer preferably has no seats to leave more room for transporting baggage.

The shape and/or the dimensions of the space 86 are suitable when two coupled vehicles have wheels with different diameters.

Figure 16:
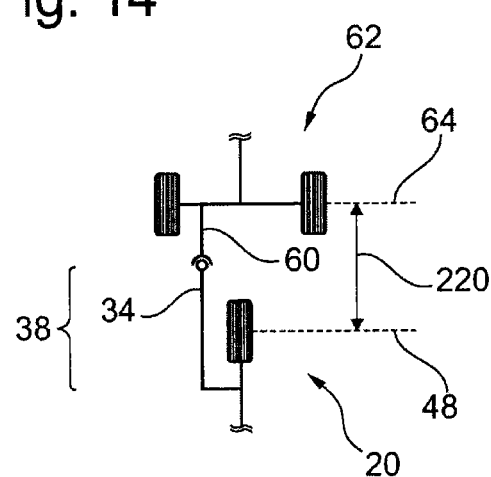
FIG. 16 represents diagrammatically, in plan view, another arrangement of the sets of wheels of vehicles coupled to one another to form the convoy from FIG. 13.

The sets of wheels of the vehicles may be less than completely nested in the coupled position. In this case, front and rear portions of the coupled vehicles are preferably conformed so that, in the coupled position, the respective transverse axes of the rear and front sets of wheels of the coupled vehicles are separated from one another by a distance less than the sum of the radius of the wheel 42 (or the radius of the front wheel of the towed vehicle if the wheels have different diameters) and the radius of the wheel 44 or 46. In another variant, this distance may be greater than the sum of these radii, as shown in FIG. 16. For example, the vehicle 20 is coupled to the rear of the vehicle 62. The transverse axis 64 of the rear set of wheels of the vehicle 62 is separated from the axis 48 by a distance (shown by the arrow 220) greater than the sum of these radii. In this case, the sets of wheels are referred to as "in tandem". Such sets of wheels in tandem are described in the document U.S. Pat. No. 3,294,418-A (T. A. MIDDLESWORTH ET AL), for example, with reference to FIGS. 3 and 4 of that document.

If these sets of wheels are not completely nested in the coupled position, the device 32 may further include an automatic control device configured to modify the steering angle of the wheels of the set of wheels 24 in response to a command only if this vehicle is coupled to the rear of another vehicle.

The articulation 31 may be implemented differently. For example, the articulation 31 is replaced by a ball-joint.

Figure 17:
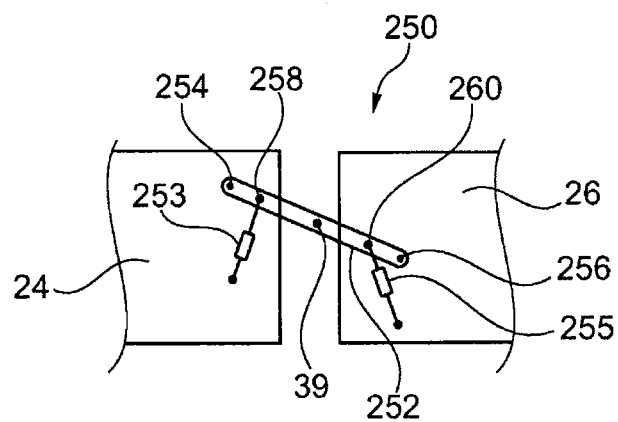
FIGS. 17 to 19 represent diagrammatically, in plan view, variants of the articulation device from FIG. 5.

FIG. 17 represents a device 250 that may be used instead of the device 30. This device 250 includes a beam 252 and actuators 253, 255 that replace the actuator 33. This beam 252 extends parallel to the rolling plane of the vehicle 20 between two ends respectively anchored to the portions 24 and 26 by anchor points 254 and 256. The actuator 253 extends between the portion 24 and an anchor point 258 on the beam 252. Likewise, the actuator 255 extends between the portion 26 and an anchor point 260 on the beam 252. Each anchor point 254, 256, 258 and 260 includes a pivot connection the rotation axis of which is perpendicular to the rolling plane. The unit 33A is modified to control the actuators 253 and 255 so as to modify the angle θ in the same manner as described in the case of the device 30. Here the method of controlling the vehicle including this device 250 includes the steps 200 to 204 and advantageously includes a step 206. During this step 206, occurring after the step 204 and following movement of the vehicle, the actuators 253, 255 are controlled so as to maintain the instantaneous rotation axis of the portions 24 and 26 relative to each other:

equidistant from the transverse axes 48, 50 of the sets of wheels of the vehicle when these transverse axes are parallel, and on the bisector of the acute angle formed by these transverse axes 48, 50 when these transverse axes are not parallel and the wheels of the vehicle 20 are not steered.

Alternatively, this beam 252 is aligned parallel to the axes 47 and 49 of the portions 24 and 26, respectively, of the vehicle 20 when these portions are aligned. A middle point of the anchor points 254 and 256 is equidistant from the transverse axes 48 and 50. A vertical plane is defined passing through this middle point and equidistant from the points 254 and 256. The actuators 253, 255, their respective anchor points and the points 258 and 260 are symmetrical in pairs with respect to this vertical plane. These actuators 253 and 255 are governed by the same control law and have the same stroke. The axis 39 is then the vertical axis passing through the middle point. The vehicle 20 can therefore follow a single track when it is included as a towed vehicle in a road convoy.

Figure 18:
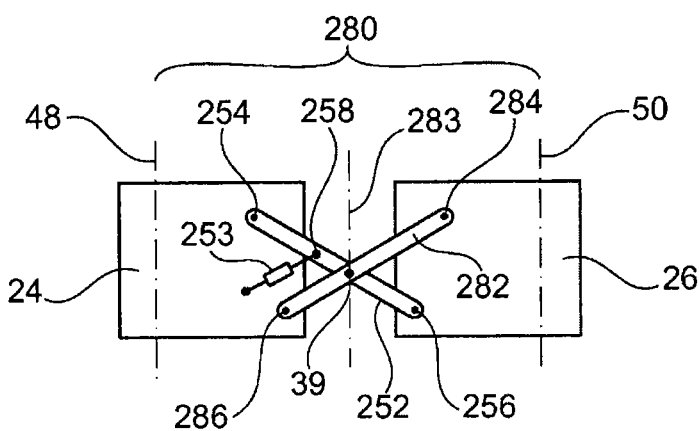

FIG. 18 represents a steering device 280 that can be used instead of the device 30 or 250. This device is identical to the device 250 except that:

the actuator 255 is omitted, a second beam 282 is added, and the beams 252 and 258 are not aligned relative to the longitudinal axis of the vehicle 20.

In plan view, the beam 282 crosses the beam 252 at the level of the instantaneous rotation axis 39 of the portion 24 relative to the portion 26. These two beams 252 and 282 now have mirror image symmetry with respect to a vertical plane 283 passing through the axis 39 and perpendicular to the longitudinal axis of the vehicle 20 when the two chassis portions are aligned. The two beams are not mechanically connected at the level of this axis 39, however. For example, the beam 282 is identical to the beam 252 except that its ends are mechanically connected to the portions 24 and 26, respectively, of the chassis of the vehicle 20 by anchor points 284 and 286, respectively. The anchor points 284, 286 are identical to the points 254 and 256 except that they are positioned so that the beam 282 crosses the beam 252 as described above. The axis 39 is preferably equidistant from the axes 48 and 50 of the vehicle. The vehicle 20 is therefore able to follow a single-track when it is included as a towed vehicle in a road convoy.

The actuator 253 may also be omitted.

Figures 19, 20:
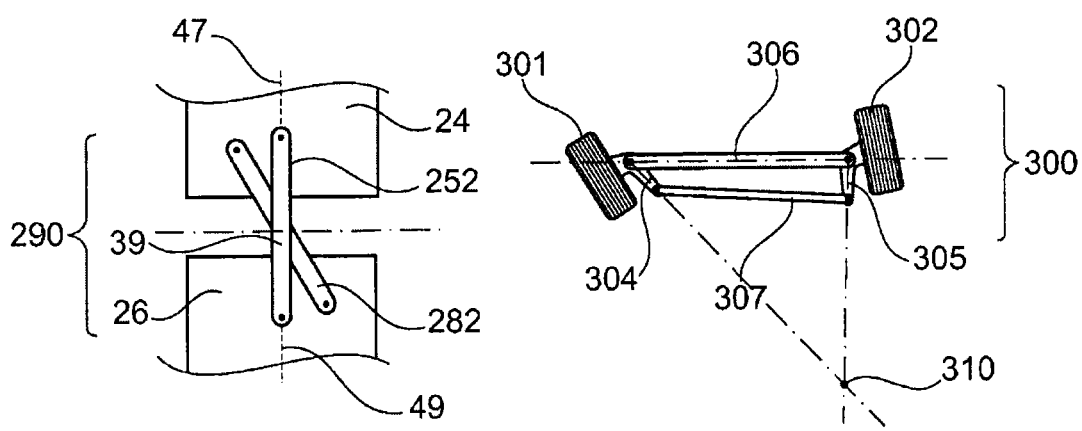
FIG. 20 represents diagrammatically, in plan view, another embodiment of the steering device from FIG. 10 when the front set of wheels of the vehicle from FIG. 2 includes more than one wheel.

FIG. 19 represents an articulation device 290 that is suitable to replace one of the devices 30, 250 or 280. This device 290 is identical to the device 280 except that:

the beams 252 and 282 are disposed so that the beam 252 is parallel to the axes 47 and 49 when the portions 24 and 26 are aligned;

the actuator 253 is omitted.

The axis 39 is the vertical axis situated at the crossing point of the two beams. However, even if this axis 39 is equidistant from the axes 48 and 50 when the portions 24 and 26 are aligned longitudinally, the conformation of this device 290 is unable to maintain the instantaneous rotation axis on the right bisector of the two axes transverse to the adjacent sets of wheels once the articulation angles are no longer zero. This device therefore causes a departure from the single-track nature of the vehicle 20, which is no longer able to follow a single-track when it is included as a towed vehicle in a road convoy.

The articulation 31 may be placed anywhere between respective vertical planes passing through the transverse axes 48 and 50. In particular, it is possible to dispose the articulation 31 in one of the planes passing through the axes 48 and 50. In this case, the instantaneous rotation axis is no longer equidistant from the two transverse axes. The convoy 110 is then not a single-track convoy.

The device 32 may be different, notably when the set of wheels 38 includes more than one wheel. For example, FIG. 20 represents a steering device 300 that can replace the device 32 if the set of wheels 38 includes two wheels 301, 302. This device 300 employs an Ackermann steering geometry. To this end, this device 300 includes:

stub axles 304, 305 connected to the wheels 301 and 302, respectively and each having a steering lever, a beam 306 fixed with no degree of freedom in rotation in yaw to the portion 24 of the chassis and mechanically connected to the steering levers of the stub axles 304 and 305 by pivot connections so that these stub axles 304 and 305 can pivot about the respective pivot axes of the wheels, and a bar 307 mechanically connected to the steering levers.

The pivot axis of a wheel is defined as being the axis about which the wheel pivots when it is steered, this pivot axis being fixed with no degree of freedom relative to the chassis portion to which the set of wheels of which the wheel is part is attached. This pivot axis is typically vertical to within 2° or 3° or 5° or 10°.

This steering device 300 is configured so that the focus point 310 of the steering levers is between parallel vertical planes passing through the axes 70 (of the towed vehicle) and 39, respectively, and preferably between the axes 50 and 39. This steering device 300 includes, for example, a rack-and-pinion steering mechanism (not represented in FIG. 18).

In another variant, the device 32 includes a "stagecoach" type steering mechanism in which the sets of wheels are connected to the chassis by an axle able to pivot about a vertical kingpin.

When the front set of wheels includes more than one wheel, the steering angle φ for all of the wheels of this front set of wheels is defined as being the acute angle formed between a vertical plane containing the longitudinal axis 47 of the portion 24 and a steering plane. This steering plane is defined as being:

the plane equidistant from the respective planes of the wheels when these wheels are parallel, and the vertical plane forming a bisector plane between the planes of the wheels of this set of wheels when these wheels are not parallel (which is for example the case of the wheels in the device 300 when these wheels are steered); these wheel planes therefore intersect.

The plane of a wheel is the vertical plane perpendicular to the orthogonal projection of the rolling axis of a wheel onto the rolling plane and passing through the geometrical center of the area of contact between this wheel and the rolling plane. In these examples, the wheels of the front set of wheels have zero camber and toe-in angles. The wheels therefore extend perpendicularly to the rolling plane. A person skilled in the art is well aware that these camber and/or toe-in angles may instead be non-zero. When the toe-in angle is not zero, the wheel planes are defined as being the planes with which the wheels would be aligned if the toe-in angle were zero.

The device 32 can also be replaced by an electronic steering device including an electrical actuator able to steer each front wheel. For example, this electrical actuator is controlled by the driver via a man-machine interface. The man-machine interface may include the steering wheel 23 associated with a sensor for sensing the angular position of this steering wheel. In this case, the steering column is omitted and replaced with a control unit that controls the electrical actuator as a function of the angle measured by the sensor.

Alternatively, one or the other of the branches 93 or 95 is omitted.

It is also possible for the devices 30 and 32 to be used simultaneously in the uncoupled position, for example. When the driver turns the steering wheel 23 this therefore causes rotation of the steering column 91 and at the same time controls the actuator 33 so as to modify the articulation angle θ. The conjoint use of the devices 30 and 32 when the vehicle 20 is uncoupled from any other vehicle makes it possible to increase its maximum steering angle.

The castor angle α of the device 32 may be zero or negative. The device 32 may also have an additional castor offset caused by misalignment of the rotation axis of the device 96 relative to the center of this wheel 42.

The mechanism 31C may be omitted. In this case, the unit 33A is also omitted. The device 30 can then be left free for the vehicle at the head of the convoy 110. The steps 200 to 204 of the method are then modified.

The mechanism 31C may omit the actuator 33. This actuator 33 may be replaced with a pair of jaws, for example, fastened to the portion 24 and adapted to clamp the shaft 51 to prevent rotation of the portions 24 and 26 relative to each other when the mechanism 31C is in the locked position.

The retaining device 34A may be implemented differently. For example, in a simplified case, the castor angle α of the wheel 42 is positive and the fork 90 is free to rotate in the bearing 96. Under these conditions, the steering angle automatically cancels out as soon as the convoy moves because of the chosen value of the castor angle α. In this embodiment, the lock 97A is replaced with a mechanism that unfastens the steering column 91 from the fork 90. The driver can therefore always turn the steering wheel 23 in the coupled position but this has no effect on the direction of the wheel 42. Such an unfastening mechanism may also be used in addition to the lock 97A in the embodiments described here.

The device 34A may also be a purely mechanical device. For example, the retaining device instead includes guides fastened to the rear set of wheels or the chassis of the vehicle 62. These guides are adapted to straighten the wheel 42 when the hitch 34 is nested inside the hitch 60. For example, these guides receive in a slidable manner the ends of the stub axle 94 to straighten the wheel 42 when the hitch 34 is nested inside the hitch 60. The same guides advantageously prevent the wheel 42 from being steered when the hitches 34 and 60 are in the coupled position, to fulfill the same function as the lock 97A. Note that in this variant the device for maintaining the steering angle of the wheel 42 of the vehicle 20 at its zero value is partly or entirely accommodated on the vehicle 62 and not on the vehicle 20.

The various variants of the device 34A described here may easily be transposed to the case of a front set of wheels including a plurality of wheels.

The hitches 34 and/or 60 may be implemented differently. For example, the hitch 34 instead includes hooks and the hitch 60 instead includes bars or rings onto which the hooks engage in the coupled position to couple the two vehicles. For example, the hitches 34, 60 form a three-point hitch like that used to hitch a trailer to a tractor.

The hitches 34 and 60 are not necessarily fixed directly to the chassis portions 24 and 26. For example, one or the other of the hitches 34 and 60 is fixed directly to the set of wheels. The two hitches 34, 60 can also be fixed directly to the sets of wheels.

Alternatively, the hitches 34 and 60 are configured so that in the coupled state the wheel 42 is aligned with the axis 47 by nesting in the rear set of wheels of the vehicle 62.

The wheels 42, 44 and 46 do not necessarily include pneumatic tires.

Alternatively, the centers of the sets of wheels of the same vehicle may not be aligned longitudinally.

Figure 21:
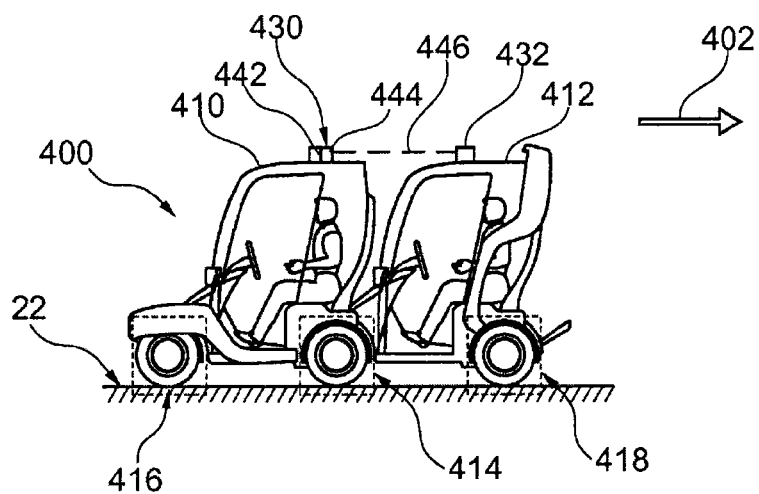
FIGS. 21 and 22 represent diagrammatically a motor road convoy formed of two towable motor vehicles from FIG. 2 coupled to each other.

FIG. 21 represents a road motor convoy 400 for which turning when reversing is facilitated. By reversing is meant a movement of the convoy essentially in a direction opposite the direction of forward movement of the same convoy. The direction of reverse movement is represented here by an arrow 402.

The convoy 400 is formed of two towable road motor vehicles 410 and 412 coupled to each other. In this description, by convention, the direction of forward movement of the convoy is the reference for defining which of the vehicles of the convoy 400 is at the head of the convoy. The same applies to the terms "front" or "rear" as applied to the convoy 400 or to elements constituting this convoy 400. Here the vehicle 410 is at the head of the convoy 400. Here the vehicle 412 is at the rear or tail-end of the convoy 400.

The vehicle 410 is identical to the vehicle 20 except that the vehicle 410 further includes a control unit 430 described in more detail hereinafter.

Here the vehicles 410 and 412 are identical.

For simplicity, only the vehicle 410 is described in detail. The equivalent of the unit 430 belonging to the vehicle 412 here bears the reference 432.

Here the vehicles 410 and 412 are coupled to each other by means of their front and rear hitches, respectively. Here the front and rear sets of wheels of the vehicles 410 and 412, respectively, are nested one in the other and form an equivalent "middle" set of wheels 414. In this example, said rear and front sets of wheels of the vehicles 410 and 412 therefore coincide in a single set of wheels and these are referred to interchangeably by the reference 414 when the vehicles 410 and 412 are coupled to form the convoy. Here the front set of wheels of the vehicle 410 bears the reference 416 and the rear set of wheels of the vehicle 412 bears the reference 418.

The set of wheels 416 advantageously has an absolute value of the castor offset ten or twenty times less than the length of the portion 24 of the vehicle 410 (hereinafter denoted length a). This makes it possible to limit the risk of the portion 24 of the vehicle 410 undergoing a high rotation in yaw about the axis 39 of the vehicle 410 when the wheels of the set of wheels 416 are steered when the convoy 400 is stationary or moving at low speed. The length of the portion 24 is defined hereinafter.

The convoy 400 is referred to as being in an aligned position when the respective portions 24 and 26 of the vehicles 410 and 412 are all aligned with one another and when the wheels of the front set of wheels are not steered. To be more precise, the convoy is referred to as being in the aligned position if the angles $\theta_1$ and $\theta_2$ and $\phi$ are all less than 10° or 5° or 2°. The articulation angles of the articulation devices 30 of the vehicles 410 and 412 are respectively denoted $\theta_1$ and $\theta_2$ here.

The unit 430 is programmed so that, when the convoy is reversing from the aligned position and the vehicle to which it belongs is at the head of the convoy 400, the angles $\theta_1$ and $\theta_2$ of the vehicles 410 and 412 are slaved to setpoint values $c\theta_1$ and $c\theta_2$ respectively computed, at all times, as a function of the steering angle $\phi$ of the front set of wheels of the vehicle 410. The definition of the setpoint values $c\theta_1$ and $c\theta_2$ is described in more detail hereinafter.

As indicated above, each articulation device 30 includes an actuator 33 adapted here to move the portions 24 and 26 to obtain a predetermined value (or setpoint value) of their respective articulation angle $\theta_1$ or $\theta_2$ and then to maintain this angle at this setpoint value until a new command is received. For example, this movement and this maintaining of this value are achieved by slaving the articulation angle to the setpoint value obtained. To this end, the unit 33A is programmed to control the actuator 33 as a function of the setpoint value and the angle measured by the sensor 33B so that the device 30 has an articulation angle $\theta_1$ or $\theta_2$ equal to this setpoint value. Here the unit 33A includes to this end a PID type controller.

The unit 430 is therefore programmed:
to measure the steering angle $\phi$ of the front set of wheels of the vehicle 410, here by means of the sensor 97E of the device 34A;
to compute setpoint values $c\theta_1$ and $c\theta_2$ for the angles $\theta_1$ and $\theta_2$, respectively, as a function of the measured angle $\phi$;
to deliver the computed setpoint values to the respective articulation devices 30 of the vehicles 410 and 412.

Figure 24:
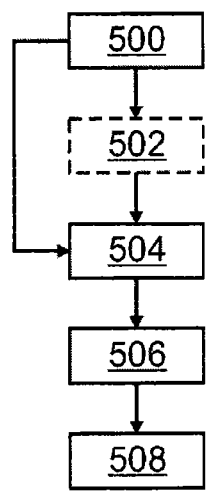
FIG. 24 is a flowchart of a method of turning when reversing the convoy from FIG. 20.

To this end, the unit 430 includes:
a computer device 442 programmed to execute the method from FIG. 24;
a data exchange interface 444 adapted:
to collect a data signal supplied by the sensor 97E;
to deliver a data signal to the devices 30 of the vehicles 410 and 412 forming the convoy 400.

The interface 444 is connected to the device 30 and to the sensor 97E of the vehicle 410, for example, by connecting wires. The interface 444 is also connected to the unit 432 by a wireless connection 446, for example.

The device 442 here includes an electronic computer such as a microprocessor.

The setpoint values $c\theta_1$ and $c\theta_2$ are chosen so that, when the convoy 400 is reversing, for example from the aligned position of the convoy represented in FIG. 21, the transverse axes of the sets of wheels 414, 416 and 418 always intersect at the same instantaneous rotation center $\Omega$ of the convoy 400.

Figure 22:
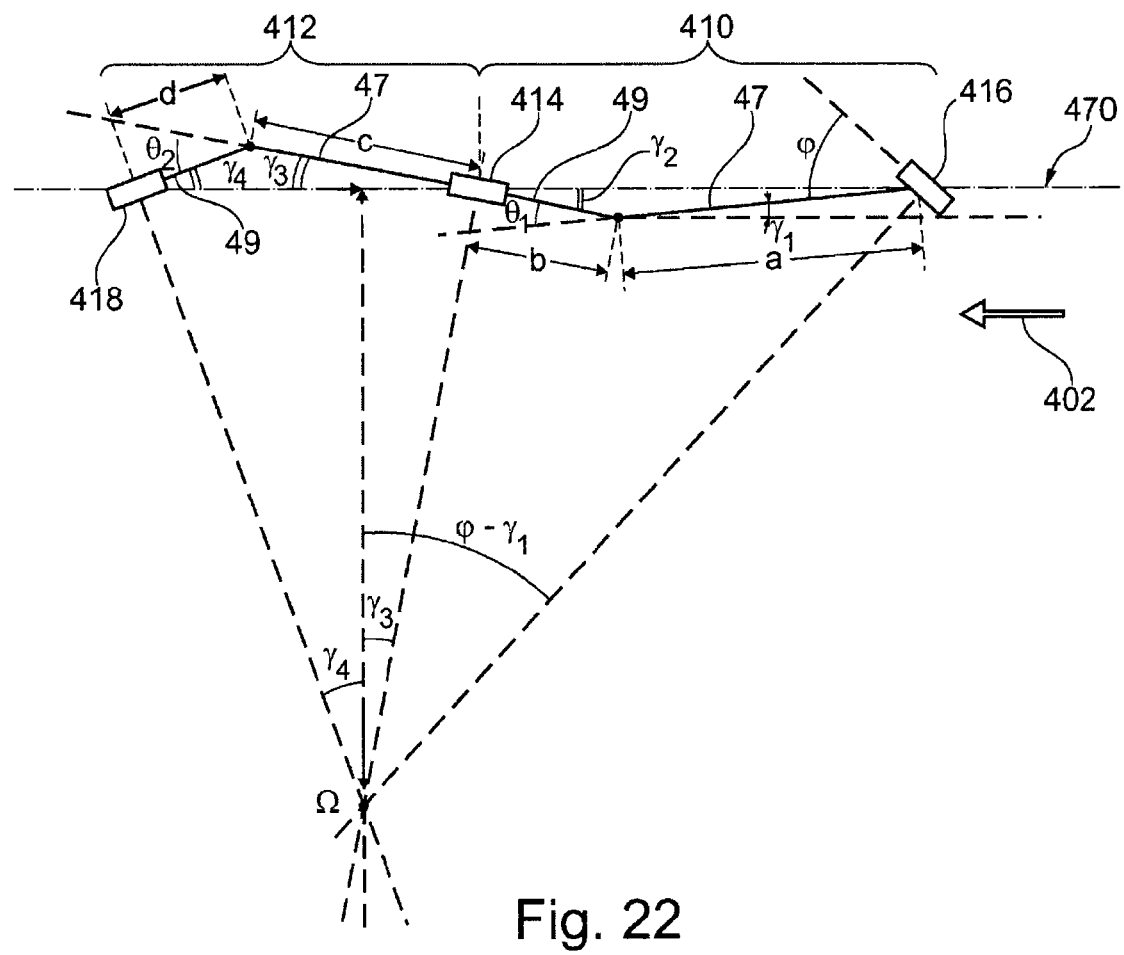
Figure 23:
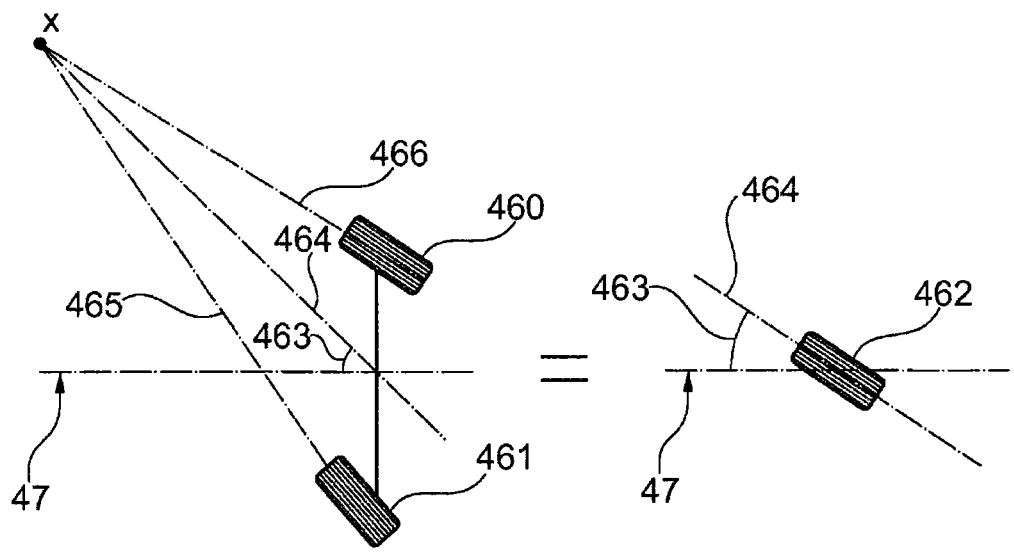
FIG. 23 represents diagrammatically an example of the definition of a set of wheels equivalent to a set of wheels of the motor vehicle from FIG. 2.

FIG. 22 represents in more detail the dimensional parameters used to define the setpoint values $c\theta_1$ and $c\theta_2$. To be more precise, FIG. 22 represents diagrammatically the vehicles 410 and 412. For simplicity, the sets of wheels are graphically represented in FIG. 22 by a single wheel. The convention governing graphical representation of the sets of wheels and definition of the steering angle of the wheels of the front set of wheels is shown diagrammatically in FIG. 23. Here two wheels 460 and 461 of a front set of wheels are considered equivalent to a single wheel 462. The steering angle 463 of this wheel 462 is then defined as the angle formed between the longitudinal axis 47 and the straight line 464 connecting the geometrical center of the front set of wheels to the focus point X. A focus point is defined with reference to FIG. 20.

The following dimensional parameters are defined for the convoy 400 (FIG. 22):
$\gamma 1$ is the angle between the axis 47 of the portion 24 of the vehicle 410 and the initial axis 470 with which the convoy is aligned when it is in the alignment position;
$\gamma 2$ is the angle between the axis 49 of the portion 26 of the vehicle 410 and the initial axis 470;
$\gamma 3$ is the angle between the axis 47 of the portion 24 of the vehicle 412 and the initial axis 470;
$\gamma 4$ is the angle between the axis 49 of the portion 26 of the vehicle 412 and the initial axis 470;
$\Omega$ is the instantaneous rotation center defined by the axles of the sets of wheels 414 and 418 of the convoy 400, this instantaneous center being the point of intersection of the respective transverse axes of the sets of wheels 414 and 418;
a and c are respectively the length of the portions 24 of the vehicles 410 and 412, each measured along the longitudinal axis 47 of this portion 24, between the axis 39 of the articulation 30 and the center of the front set of wheels of this vehicle;
b and d are respectively the length of the portions 26 of the vehicles 410 and 412, each measured along the longitudinal axis 49 of this portion 26, between the axis 39 of the articulation 30 and the center of the rear set of wheels of this vehicle.

Here all distances are measured in a plane parallel to the rolling plane of the convoy.

In this example, the vehicles 410 and 412 are identical and the lengths a and b are therefore equal, likewise the lengths c and d. However, the notation and the formulas used hereinafter are valid in the general case where the vehicles 410 and 412 are not identical and the values of a, b, c, d are different.

Generally speaking, the setpoint values are chosen so that the path followed by the geometrical center of the set of wheels 416 is tangential to the turning circle centered on the instantaneous rotation center $\Omega$. This notably facilitates absence of skidding of the front set of wheels when turning in place. The position of the center $\Omega$ is defined by the intersection of the transverse axes of the sets of wheels 414 and 418. This condition is referred to hereinafter as the optimality condition.

A system of Cartesian coordinate axes is defined here taking as the origin the initial position of the geometrical center of the set of wheels 418 before the convoy 400 reverses and taking:
for the abscissa axis, the axis 470, and
for the ordinate axis, an axis perpendicular to the axis 470 and parallel to the plane of the road.

With these conventions, the center $\Omega$ is defined by the following equations:

$\overrightarrow{\Omega AR} \cdot \overrightarrow{TAR} = 0$ and $\overrightarrow{\Omega MI} \cdot \overrightarrow{TMI} = 0$, where:

the point AR is the geometrical center of the set of wheels 418;

$\overrightarrow{TAR}$ is the vector tangential to the path of the geometrical center of the set of wheels 418 originating at the point AR during a maneuver of turning in place;

the point MI is the geometrical center of the set of wheels 414;

$\overrightarrow{TMI}$ is the vector tangential to the path of the geometrical center of the set of wheels 414 originating at the point MI during a maneuver of turning in place;

$\overrightarrow{\Omega AR}$ and $\overrightarrow{\Omega MI}$ are the vectors connecting the center $\Omega$ to the points AR and MI, respectively.

During movement of the convoy 400, the point AR has in this system of axes the coordinates $x_{AR}$ and $y_{AR}$ defined as follows:

$$x_{AR} = d \times (1 - \cos(y_4))$$
$$y_{AR} = \frac{d}{2} \times \ln\left(\frac{1+\sin(y_4)}{1-\sin(y_4)}\right) - d \times \sin(y_4)$$

where:

$$y_4 = a\sin\left(\frac{\left(\frac{1+\sin(y_3)}{1-\sin(y_3)}\right)^{\frac{c}{d}} - 1}{\left(\frac{1+\sin(y_3)}{1-\sin(y_3)}\right)^{\frac{c}{d}} + 1}\right)$$

Likewise, when the convoy 400 is moving, the point MI has in this system of axes the coordinates $x_{MI}$ and $y_{MI}$ defined as follows:

$$x_{MI} = d + c \times \cos(y_3)$$
$$y_{MI} = \frac{c}{2} \times \ln\left(\frac{1+\sin(y_3)}{1-\sin(y_3)}\right) - c \times \sin(y_3)$$

The vectors $\overrightarrow{TAR}$ and $\overrightarrow{TMI}$ have the values:

$$\overrightarrow{TAR} = \begin{pmatrix} \cos(y_4) \\ \sin(y_4) \end{pmatrix}$$

$$\overrightarrow{TMI} = \begin{pmatrix} -\cos(y_3) \\ \sin(y_3) \end{pmatrix}$$

The optimality condition is then given by the following equation:

$$\overrightarrow{\Omega AV} \cdot \overrightarrow{TAV} = 0$$

where:

the point AV is the geometrical center of the set of wheels 416;

$\overrightarrow{TAV}$ is the vector tangential to the path traced out by the geometrical center of the set of wheels 416 and having the point AV as its origin during a maneuver of turning in place;

$\overrightarrow{\Omega AV}$ is the vector connecting the center $\Omega$ to the point AV.

In this example, the vector $\overrightarrow{TAV}$ is denoted as follows:

$$\overrightarrow{TAV} = \begin{pmatrix} -(c+b) \times \sin(y_3) - a \times \cos(y_1) \times \frac{dy_1}{dy_3} \\ \frac{c \times \sin^2(y_3)}{\cos(y_3)} - b \times \cos(y_3) + a \times \cos(y_1) \times \frac{dy_1}{dy_3} \end{pmatrix}$$

The optimality condition therefore makes it possible to establish a differential equation for defining the angle $\gamma 1$ as a function of the angle $\gamma 3$. This differential equation can be integrated as a function of the initial condition $\gamma 1$ ($\gamma 3 = 0$) = 0, which corresponds to the condition of alignment of the convoy 400.

The angle $\phi$ is then defined by the following equation:

$$\varphi = -a\tan\left(\frac{\frac{c \times \sin^2(y_3)}{\cos(y_3)} - b \times \cos(y_3) + a \times \cos(y_1) \times \frac{dy_1}{dy_3}}{-(c+b) \times \sin(y_3) - a \times \cos(y_1) \times \frac{dy_1}{dy_3}}\right) + y_I$$

Taking as hypotheses that the angles $\gamma 1$, $\phi$ and $\gamma 2$ are small, this differential equation can be solved approximately. The following approximations are then obtained because in this case the angles $\gamma 1$ to $\gamma 4$ are also small:

$\gamma 2 = \gamma 3$;

$\gamma 4 = \gamma 3 \times c/d$;

$b \times \gamma 2 = a \times \gamma 1$.

Solving this equation under these conditions yields the following solution:

$\theta_1$ is equal to $\phi \times [d \times (a+b)]/[a \times d + a \times b + a^2 + b \times d]$, and $\theta_2$ is equal to $\phi \times [a \times (c+d)]/[a \times d + a \times b + a^2 + b \times d]$.

Here, the values of the setpoints $c\theta_1$ and $c\theta_2$ are therefore chosen to be equal to $\phi \times [d \times (a+b)]/[a \times d + a \times b + a^2 + b \times d]$ and $\phi \times [a \times (c+d)]/[a \times d + a \times b + a^2 + b \times d]$, respectively. Under these conditions, by slaving the angles $\theta_1$ and $\theta_2$ to these setpoint values $c\theta_1$ and $c\theta_2$, respectively, during turning in place or reversing, the path of the set of wheels 416 is centered on the instantaneous rotation center $\Omega$ of the sets of wheels 414 and 418.

The convoy 400 therefore performs in a simplified manner when reversing, in that all the sets of wheels of the convoy 400 have a path centered on the same instantaneous rotation center $\Omega$, as is the case for a standard motor vehicle with two axles with no articulation device 30. Also, this configuration reduces or even eliminates the drawback of jacknifing relative to the rest of the convoy that, because of its negative castor offset, the set of wheels 418 would naturally suffer during reversing if the devices 30 of the vehicles 410 and 412 were free to move in an uncontrolled manner. Reversing of the convoy 400 is therefore facilitated, because the convoy 400 therefore has a lower risk of jacknifing when steering the wheels of the set of wheels 416, whether in place or during reversing. Moreover, this advantage is achieved without it being necessary to cause the wheels to skid on the road, i.e. without the wheels having to slide perpendicularly to their path. This therefore limits wear of the tires of the wheels.

In this example, the value of $\phi$ is preferably limited within a predefined range. For example, the absolute value of $\phi$ is less than or equal to 20° or 15° or 10°.

Here $c\theta_1$ and $c\theta_2$ are computed in real time, whether the convoy 400 is stationary or reversing. When the convoy 400 is reversing, this calculation is performed by updating the measured and computed values as the convoy 400 moves, notably as a function of the changing value of $\phi$. The values of $c\theta_1$ and $c\theta_2$ are therefore recomputed and then transmitted to the respective devices 30 at various times during the reversing of the convoy 400. For example, the values of $c\theta_1$ and $c\theta_2$ are updated every 10 ms or every 100 μs.

The unit 430 is advantageously adapted to detect if the convoy 400 is in a non-aligned position if the driver of the convoy 400 (i.e. here the driver of the vehicle 410 situated at the head of the convoy 400) wishes to start a reversing maneuver.

In this case, the unit 430 is able to prevent reversing if the convoy is not in an aligned position.

An example of a method of reversing the convoy 400 is described next with reference to the FIG. 24 flowchart and with the aid of FIGS. 21 and 22.

During a step 500, the unit 430 verifies automatically if the convoy is in an aligned position. For example, the unit 430 collects the values of the angles $\theta_1$ and $\theta_2$ measured by the respective sensors 33B of the devices 30 of the vehicles 410 and 412 and compares these measured values to predefined limit values. In this example, if at least one of the measured absolute values of the angles $\theta_1$, $\theta_2$ and $\phi$ is greater than a predefined limit value equal to 10° or 5° or 3° or 1° then the convoy is considered not to be in an aligned position.

If the convoy 400 is considered not to be in an aligned position, then reversing is inhibited for as long as the convoy 400 is not in the aligned position. In fact, if reversing is attempted when the convoy is stationary and not aligned, there is a risk of causing significant skidding of the tires of the wheels of one of the sets of wheels 414, 416 or 418.

Here the convoy 400 is then realigned automatically during a step 502.

If the convoy is considered to be in an aligned position, then the method proceeds to the step 504.

Then, once the convoy 400 is in the aligned position, the unit 430 allows reversing of the convoy 400 during a step 504.

During a step 506 the unit 430 slaves the angles $\theta_1$ and $\theta_2$. Here the step 506 begins when the convoy 400 is stationary in the aligned position and then continues concomitantly with the reversing of the convoy 400.

First, the devices 30 of the vehicles 410 and 412 are controlled by the unit 430 so as to accompany a turning movement of the convoy 400 imposed by the driver of the convoy. To be more precise, here the unit 430:

collects the current values of the angle $\phi$ measured by the sensor 97E;

computes the setpoint values $c\theta_1$ and $c\theta_2$;

delivers commands to the respective articulation device 30 of the vehicles 410 and 412, notably commands containing the setpoint values. For example, here a command containing the setpoint value $c\theta_1$ is transmitted to the unit 33A of the vehicle 410 and a command containing the setpoint value $c\theta_2$ is transmitted to the unit 33A of the vehicle 412 via the connection 446 and the unit 432. The unit 33A of the device 30 of the vehicle 410 controls the actuator 33 of the device 30 to which it belongs as a function of the angle $\theta_1$ measured by the sensor 33B so that the articulation angle $\theta_1$ is equal to the setpoint value $c\theta_1$. Likewise for the unit 33A of the device 30 of the vehicle 412, with reference to the angle $\theta_2$ and the setpoint value $c\theta_2$.

Here these collection, computation and delivery steps are repeated at different times, both when the convoy 400 is stationary and when the convoy 400 is reversing.

In this example, the unit 432 plays a passive role, i.e. the setpoint values $c\theta_1$ and $c\theta_2$ are computed entirely by the unit 430. This is because the vehicle 412 is not at the head of the convoy 400. Here the only function of the unit 432, when the vehicle 412 is coupled to the rear of the vehicle 410, is to relay commands from the unit 430 to the device 30 of the vehicle 412. To this end, each unit 430 or 432 determines beforehand, using the sensor 97B of the position of the hitch 34, if the vehicle to which it belongs is at the head of the convoy or not.

Finally, during a step 508, reversing stops. The convoy 400 may then become stationary or move forward. The convoy 400 may equally reverse again. In this case, the step 500 is applied again.

The values of the setpoints $c\theta_1$ and $c\theta_2$ that make it possible to maintain the angles $\theta_1$ and $\theta_2$ at values such that the optimality condition is satisfied may be computed differently. For example, approximations other than those made hereinabove to obtain the formulas that yield the setpoint values $c\theta_1$ and $c\theta_2$ as a function of the angle $\phi$ may be produced. Generally speaking, whatever the formulas used, the setpoint values $c\theta_1$ and $c\theta_2$ are equal to $\phi \times [d \times (a+b)]/[a \times d + a \times b + a^2 + b \times d]$ and $\phi \times [a \times (c+d)]/[a \times d + a \times b + a^2 + b \times d]$, respectively, to within 20% or 10% or 5%, for low values of the angle $\phi$.

A variant of the convoy 400 includes non-motorized vehicles. For example the convoy 400 is formed of a motor vehicle and a trailer.

A variant of the vehicle 412 does not include the device 32.

Alternatively, the vehicles 410 and 412 may exhibit differences, notably in their dimensions. Thus the lengths a and c may be different. Likewise, the lengths b and d may be different.

In a variant, the rear and front sets of wheels of the vehicles 410 and 412, respectively, are not nested. For example, these sets of wheels are in the "in tandem" configuration described above. In this case, the middle set of wheels is the equivalent set of wheels formed by these sets of wheels in tandem.

In a variant, the units 430 and 432 are configured so that the unit 430 transmits the value of $\phi$ to the unit 432 and this unit 432 computes the setpoint $c\theta_2$ from this transmitted value $\phi$.

The unit 430 is advantageously able to command straightening up of the convoy 400 in its aligned position. To this end, the unit 430 is notably able to collect the angle values measured by the respective sensors 33B of the devices 30 of the vehicles 410 and 412 and by the sensor 97E.

The units 430 and 432 may be implemented differently. For example, these units 430 and 432 are provided by means of a mechanical mechanism such as a rod type transmission, a chain, a cable or a belt. This mechanism is sized so as to slave the angles $\theta_1$ and $\theta_2$ to the setpoint values $c\theta_1$ and $c\theta_2$.

The value of $\phi$ may be limited differently or this limitation may even be omitted.

In a variant, the value of the angle 463 is defined as the mean of the values of the steering angles of the two wheels 460 and 461. If the set of wheels includes only one wheel, then the angle 463 is defined as the steering angle of this wheel. Likewise when the set of wheels includes a stagecoach type steering device. In a variant, this angle 463 may be estimated by installing a sensor on a mechanical device approximately reproducing the kinematics of this angle 463.

The values measured and computed by the control unit may be updated at different times. This updating may also take place only when the driver of the convoy 400 manipulates the steering wheel 23.

Slaving these angles to perform reversing may also be implemented when the convoy 400 is stationary, in a reversing situation and the driver turns in place the wheels of the set of wheels 416. The convoy 400 is referred to as being in a reversing situation when the driver of the convoy 400 has engaged reverse but has not started the convoy 400 moving. The steps described with reference to reversing the convoy can therefore apply when the convoy 400 is stationary. In particular, during the step 500, the steering wheel 23 is inhibited when the convoy 400 is in the reversing situation but is not in the aligned position. During the step 504, the unit 540 further allows movement of the steering wheel 23 to steer the wheels in place. During the step 506, the slaving, collection, computation and delivery operations are then reiterated concomitantly with the actuation in place of the steering wheel 23 by the driver of the vehicle.

Slaving the articulation angles $\theta_1$ and $\theta_2$ to perform reversing as described here with reference to the convoy 400 may be used independently of the characteristics bearing on the towable character of the vehicles 410 and 412. It may therefore be used for a road motor convoy in which the vehicles 410 and 412 cannot be uncoupled or are not able to circulate autonomously when uncoupled from each other. For example, this slaving may be applied in any motor vehicle having three sets of wheels, pairs of which are separated by articulation devices having the features of the device 30. For example, this slaving may be implemented in a motor vehicle such as a road train or a bendy bus.

The invention claimed is:

1. A towable road motor vehicle, comprising:
   at least three wheels, capable of driving the motor vehicle on a flat road, distributed between a front set of wheels and a rear set of wheels of the motor vehicle;
   a chassis, including:
      a front portion to which the front set of wheels is fixed;
      a rear portion to which the rear set of wheels is fixed;
      an articulation device disposed between the front and rear portions of the chassis, the articulation device allowing the front portion to pivot relative to the rear portion about an articulation axis normal to a rolling plane of the vehicle to modify an articulation angle of the vehicle, the rolling plane being defined as being the plane passing through areas of contact between the road and the wheels of the vehicle;
   a front hitch and a rear hitch situated at the front and at the rear, respectively, of the motor vehicle,
   the front hitch being movable, alternately, between:
      a coupled position in which this front hitch cooperates with a rear hitch identical to the rear hitch of this vehicle and situated on another vehicle to couple these vehicles mechanically to each other with no degree of freedom in rotation in yaw and to align the front portion of this vehicle with the rear portion of the other vehicle, and
      an uncoupled position in which these vehicles are uncoupled from each other;
   the rear hitch being movable, alternately, between:
      a coupled position, in which this rear hitch cooperates with a front hitch identical to the front hitch of this vehicle and situated on another vehicle to couple these vehicles mechanically to each other with no degree of freedom in rotation in yaw and to align the rear portion of this vehicle with the front portion of the other vehicle, and
      an uncoupled position in which these vehicles are uncoupled from each other;
   a steering device adapted, in response to a command from a driver of the vehicle, to modify the steering angle of each wheel of the front set of wheels, the steering device being adapted to be actuated independently of the articulation device, the steering device having a castor offset with an absolute value strictly less than one third of the shortest distance separating the articulation axis from a transverse axis of the front set of wheels when the transverse axis of the front set of wheels is parallel to a transverse axis of the rear set of wheels, the transverse axis of a set of wheels being defined as being:
      the axis passing through the geometrical center of the area of contact between the road and the wheels of the set of wheels when that set of wheels includes more than one wheel and those wheels are not steered, and
      the axis parallel to the rolling axis of a wheel and passing through the geometrical center of the area of contact between the road and that wheel if the set of wheels includes only that wheel and that wheel is not steered.

2. The vehicle as claimed in claim 1, further comprising a device for maintaining the steering angle of each wheel of the front set of wheels of this vehicle or of another vehicle to which it is coupled at its zero value while this vehicle is coupled to that other vehicle.

3. The vehicle as claimed in claim 1, wherein the articulation device includes a controllable locking mechanism adapted to move alternately between:
   a locked position in which it locks the articulation device in a position in which the front and rear portions of the chassis of the vehicle are aligned relative to each other if the front hitch of this vehicle is uncoupled, and
   an unlocked position in which the front and rear portions are free to pivot relative to each other about the articulation axis if the front hitch of this vehicle is coupled.

4. The vehicle as claimed in claim 1, wherein the articulation device includes a mechanical articulation including a pivot connection about the articulation axis, the articulation axis being equidistant from the transverse axes of the front set of wheels and the rear set of wheels of the vehicle.

5. The vehicle as claimed in claim 1, wherein the vehicle includes an articulation device including a first beam and a second beam each extending parallel to the rolling plane of the vehicle between two ends respectively anchored to the front and rear portions of the vehicle via anchor points each including a pivot connection with the rotation axis perpendicular to the rolling plane;
   the first and second beams crossing each other at the level of the articulation axis and having, when the front portion and the rear portion of the chassis are aligned, mirror image symmetry with respect to a vertical plane passing through the articulation axis and parallel to the transverse axis of the rear set of wheels, the articulation axis being equidistant from the transverse axes of the front and rear sets of wheels of the vehicle.

6. The vehicle as claimed in claim 1, wherein the front set of wheels and the rear set of wheels have complementary shapes so that in the coupled position the front set of wheels of the other vehicle can be nested in the rear set of wheels of this vehicle so that the transverse axes of the rear and front sets of wheels, respectively, of this vehicle and of the other vehicle are separated from each other by a distance less than the sum of the radius of a wheel of this front set of wheels and the radius of a wheel of this rear set of wheels and preferably so that these transverse axes coincide.

7. The vehicle as claimed in claim 1, wherein the front and rear hitches are configured so that in the coupled position a transverse axis of the front set of wheels of the other vehicle is at a distance from a transverse axis of the rear set of wheels of this vehicle greater than or equal to the sum of the radius of a wheel of this front set of wheels and the radius of a wheel of this rear set of wheels.

8. The vehicle as claimed in claim 3, wherein the articulation device includes mechanical stops such that, when the controllable locking mechanism is in its locked position, the smallest steering radius of the steering device of the vehicle is greater than the smallest steering radius allowed by the articulation device.

9. The vehicle according to claim 1, wherein:
the front set of wheels includes two wheels;
the steering device includes an Ackermann steering mechanism adapted to modify the steering angle of these wheels.

10. The vehicle as claimed in claim 1, wherein:
the front set of wheels includes a single wheel;
the steering device includes a steering bar mechanically connected to a hub of the wheel and a bearing inside which the steering bar pivots.

11. The vehicle as claimed in claim 1, further comprising:
a steering wheel adapted to control the steering device;
a driver's seat from which a driver of the vehicle can actuate the steering wheel;
a passenger compartment fastened with no degree of freedom in yaw to the front portion of the chassis so that the passenger compartment moves relative to the rear portion of the chassis when the articulation angle varies, the steering wheel and the driver's seat being fixed inside this passenger compartment.

12. A road motor convoy including at least two coupled road motor vehicles, wherein each of these vehicles is as claimed in claim 1, these vehicles being coupled in pairs by the respective front and rear hitches of these vehicles.

13. A method of controlling a towable road motor vehicle as claimed in claim 1, wherein:
when the front hitch is in its coupled position the articulation device is commanded to allow the front and rear portions of the chassis to pivot about the articulation axis and the steering device is inhibited so that it cannot be actuated by the driver;
when the front hitch is in the uncoupled position the steering device is activated so that it can be actuated by the driver.

14. The control method as claimed in claim 13, further comprising:
at least one commandable actuator adapted to vary a position of an instantaneous rotation axis of the front portion relative to the rear portion of the chassis of the vehicle;
controlling the at least one actuator to maintain the instantaneous rotation axis of the front portion of the chassis relative to the rear portion of the chassis:
equidistant from the transverse axes of the sets of wheels of the vehicle when these transverse axes are parallel, and
on the bisector of the acute angle formed by these transverse axes when these transverse axes are not parallel.

15. A method of controlling reversing of a road motor convoy, comprising:
providing a road motor convoy as claimed in claim 12, the convoy being formed of first and second vehicles coupled to each other, the first vehicle being placed at a head of the motor convoy, the head of the convoy designating an end of the motor convoy to which the motor convoy moves when the convoy moves forwards, forward motion corresponding to a direction of movement opposite that of rearward motion, the second vehicle being coupled behind the first vehicle;
reversing movement of the convoy;
during reversing, slaving the articulation devices of the first and second vehicles to maintain a path followed by the geometrical center of the front set of wheels of the first vehicle tangential to a turning circle with the center situated at the intersection of the transverse axes of the rear sets of wheels of the first and second vehicles.

16. The method as claimed in claim 15, wherein the slaving comprises:
slaving articulation angle $\theta_1$ of the first vehicle to a setpoint $c\theta_1$, the value of the first setpoint $c\theta_1$ being equal at all times to $\phi \times [d \times (a+b)]/[a \times d + a \times b + a^2 + b \times d]$ to within 20% in which:
$\phi$ is a current value of the steering angle of the wheels of the front set of wheels of the first vehicle, the absolute value of this angle $\phi$ being less than or equal to 20°;
a and c are respectively lengths of the front portions of the first vehicle and the second vehicle of the convoy, these lengths being measured for each vehicle between the articulation axis of said vehicle and the geometrical center of the front set of wheels of this vehicle;
b and d are respectively lengths of the rear portions of the first vehicle and the second vehicle of the convoy, these lengths being measured for each vehicle between the articulation axis of said vehicle and the geometrical center of the rear set of wheels of this vehicle; and
simultaneously slaving articulation angle $\theta_2$ of the second vehicle to a setpoint $c\theta_2$, the value of the second setpoint $c\theta_2$ being equal to all times to $\phi \times [a \times (c+d)]/[a \times d + a \times b + a^2 + b \times d]$ to within 20%.

* * * * *